United States Patent [19]

Matekunas

[11] Patent Number: 4,624,229
[45] Date of Patent: Nov. 25, 1986

[54] ENGINE COMBUSTION CONTROL WITH DILUTION FLOW BY PRESSURE RATIO MANAGEMENT

[75] Inventor: Frederic A. Matekunas, Troy, Mich.

[73] Assignee: General Motors Corporation, Detroit, Mich.

[21] Appl. No.: 792,676

[22] Filed: Oct. 29, 1985

[51] Int. Cl.$^4$ ............................................... F02P 5/14
[52] U.S. Cl. .................................. 123/425; 123/435; 123/571
[58] Field of Search ....................... 123/425, 435, 571

[56] References Cited

U.S. PATENT DOCUMENTS

| | | | |
|---|---|---|---|
| 4,063,538 | 12/1977 | Powell et al. | 123/425 |
| 4,449,501 | 5/1984 | Greeves | 123/425 |
| 4,531,499 | 7/1985 | Eckert et al. | 123/571 |
| 4,556,030 | 12/1985 | Aono | 123/425 |

Primary Examiner—Raymond A. Nelli
Attorney, Agent, or Firm—Robert M. Sigler

[57] ABSTRACT

A control for an internal combustion engine by pressure ratio management. The ratio of combustion chamber pressure to motored pressure is determined for several predetermined crankshaft rotational angles. These pressure ratios are used to control ignition timing for MBT, diluent gas flow rate (EGR) and fuel balance among combustion chambers. The control requires from three to five pressure samples for each combustion event, depending on sensor and control options. The pressure sensors need not sense absolute pressure if they are linear and do not change gain or bias significantly during one cycle.

15 Claims, 6 Drawing Figures

ENGINE COMBUSTION CONTROL WITH DILUTION FLOW BY PRESSURE RATIO MANAGEMENT

BACKGROUND OF THE INVENTION

This invention relates to combustion control in an internal combustion engine, and particularly to the control of dilution gas flow in response to the ratio of combustion chamber pressure to motored pressure as a function of crankshaft rotational angle.

Currently, control of internal combustion engines is based on sensing a set of variables such as coolant temperature, manifold pressure, engine speed and exhaust oxygen concentration and adjusting ignition timing, EGR rate and fuel flow to a prescribed calibration for a baseline engine. The problem with this approach is that, because of manufacturing differences and aging, the engine being controlled is not necessarily the same as the baseline engine used for reference. One approach to the solution of this problem requires extensive effort in the design of the engine to ensure both that all combustion chambers behave the same and that components will not significantly alter characteristics with aging. But even with such design and tight quality control in the manufacturing process, the required uniformity and stability over time of such engines cannot always be achieved.

A second approach to the solution of the problem is to implement a control system with the capability to adjust for these differences and changes. Such a control system is possible using combustion chamber pressure sensors and applying feedback control to ignition timing, dilution gas rate and fuel rate.

In a typical current engine control, the three controlled combustion parameters are spark timing (or fuel injection timing in a diesel engine), EGR rate and air/fuel ratio. The first affects the timing of the initiation of the combustion process while the latter two affect the speed and duration of the combustion process. In current practice, air/fuel ratio is generally controlled in closed loop by an exhaust oxygen sensor to produce a constant stoichiometric ratio for emission control by oxidizing and reducing catalysts in the exhaust system. Since the efficiency of one or the other catalyst falls rapidly as the air/fuel ratio strays even slightly from stoichiometric in either direction, this parameter must be strictly controlled and is not available for maximizing power or fuel efficiency. EGR is generally controlled by a combination of different parameters such as exhaust backpressure, engine coolant temperature, engine speed, throttle position or manifold pressure and has proven difficult to control accurately. Spark or injection timing is generally determined from a stored table addressed with engine speed and load parameters with additional retard, in some cases, in response to a knock, MAP or throttle movement detector.

Closed loop combustion control has been suggested in the prior art in various forms. LPP spark timing control systems have been proposed, in which spark timing is controlled to maintain a predetermined location of peak combustion pressure. This stability of the timing of peak combustion pressure has been found to produce MBT operation for many engine operating conditions. The location of peak pressure may be sensed using headbolts with an embedded piezoelectric material which responds to the stresses created in reaction to the pressure on the engine cylinder head. However, this approach has difficulties when the combustion charge is highly dilute or the engine is under light load. Some systems have been suggested which adjust ignition timing to control maximum absolute combustion pressure with respect to some predetermined reference level. There is, in addition, a suggestion, in the Greeves U.S. Pat. No. 4,449,501, issued May 22, 1984, that ignition timing be controlled to maintain the ratio of maximum combustion chamber pressure to maximum motored pressure in accordance with a stored table addressed by engine speed and load factors. These approaches, however, involve stored references determined for a baseline engine which may not be the desired reference for any particular engine at any given time. Other approaches have involved sensing flame position using ion gaps or engine speed variations. These approaches have drawbacks related, respectively, to cyclic variability in flame position and to difficulties with vehicle transients. If a measure of combustion pressure is available, several other approaches have been suggested. With unlimited computing capability, one might be able to perform a detailed heat release analysis or to obtain combustion duration to estimate air/fuel ratio. However, the computational requirements of these schemes prohibits their application for the foreseeable future.

SUMMARY OF THE INVENTION

The primary object of this invention is to control the operation of an internal combustion engine from combustion chamber pressures measured at a few predetermined crankshaft rotational angles during an engine cycle. In particular, the optimal dilution gas or EGR flow may be determined by comparing the ratio of sensed combustion chamber pressure to motored pressure at a predetermined crankshaft rotational angle after ignition with a reference. The predetermined crankshaft rotational angle may be at substantially complete combustion, in which case the reference is a stored reference predetermined from engine testing. Alternatively, the predetermined crankshaft rotational angle may occur during combustion, in which case a similar pressure ratio is determined for another predetermined crankshaft rotational angle at substantially complete combustion for use as the reference. The motored pressures may be derived from the combustion chamber pressure sensed at a predetermined crankshaft angle prior to combustion. If combustion chamber pressure is sensed at yet another crankshaft rotational angle prior to combustion, the combustion chamber pressure sensor need not sense absolute pressure, as long as it is linear and does not change its gain or bias significantly during one engine cycle.

Further details and advantages will be apparent from the accompanying drawings and following description of a preferred embodiment.

DESCRIPTION OF THE PREFERRED EMBODIMENT

Mathematical Background

Figure 1:
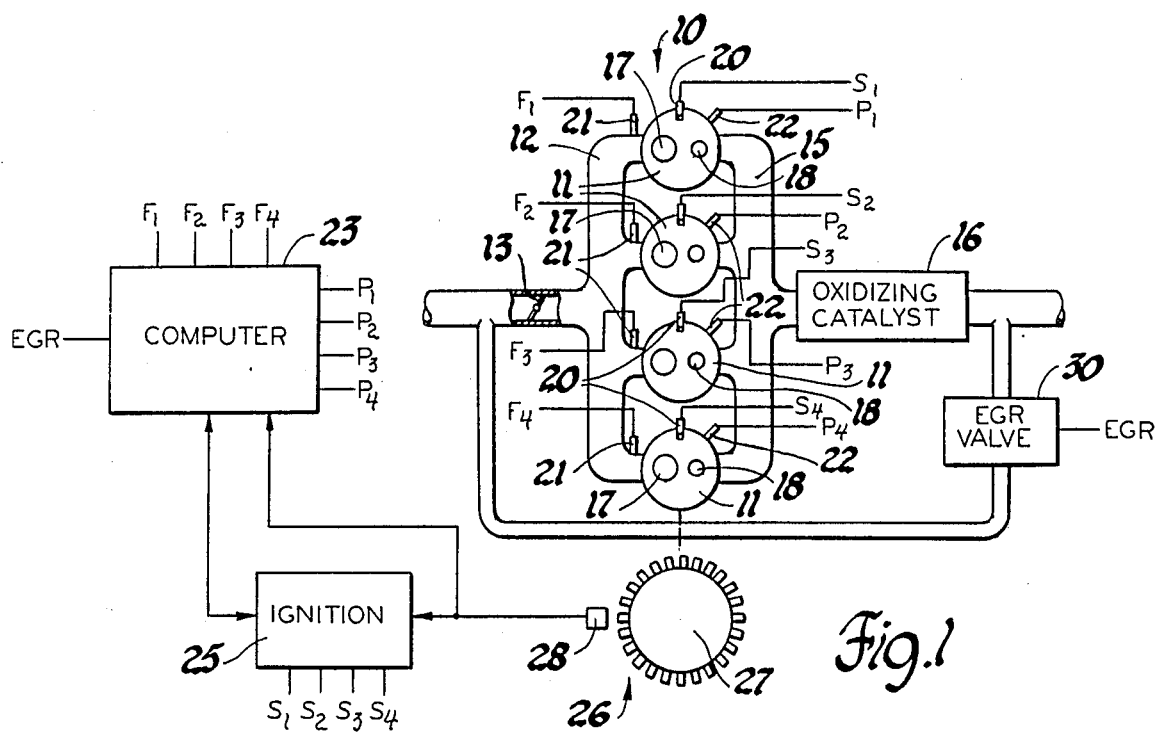
FIG. 1 is a schematic diagram of an engine with a control according to this invention.

First the mathematical equations upon which this invention is based will be derived. The goal of this derivation is to produce a first order approximation based on combustion chamber pressure measurement which is computationally fast enough to be usable in engine operation.

The contents of the engine combustion chamber are assumed to behave as an ideal gas with constant properties. The derivation starts with the First Law of Thermodynamics for the mixture, with terms defined at the end of the specification before the claims.

$$dU = dQ - dW \tag{1}$$

The work done by the piston may be expressed.

$$dW = P\, dV \tag{2}$$

Other relations for an ideal gas are listed.

$$dU = m\, cv\, dT \tag{3}$$

$$P V = m R T \tag{4}$$

$$cp - cv = R \tag{5}$$

$$cp/cv = Gm \tag{6}$$

The heat addition may be viewed as a balance between energy supplied to the combustion chamber contents by the combustion process and heat exchange with the combustion chamber walls.

$$dQ = hc\, d(mb) - d(qw) \tag{7}$$

These relations may be combined to yield a differential equation in terms of the combustion chamber pressure and volume and the net heat addition.

$$dP + (Gm\, P/V)dV = (R/cv\, V)\,[hc\, d(mb) - d(qw)] \tag{8}$$

When the differentials are expressed as derivatives with respect to crankshaft rotational angle, this equation represents a first order linear differential equation with the following solution.

$$P(\theta) = Pmot(\theta)[1.0 + (cv\, To\, m)^{-1} INT1] \tag{9}$$

In the preceding equation, INT1 is the integral from $\theta$spk to $\theta$ of the following expression.
$$[hc\, dmb(\theta)/d\theta - dqw(\theta)/d\theta][V(\theta)/Vo]^{(Gm-1)} d\theta$$

By defining a term for the total heat of combustion, hc mf, and factoring it from within the integral, Equation 9 may be rewritten.

$$P(\theta) = Pmot(\theta)[1.0 + (hc\, mf)/(cv\, To\, m)]INT2 \tag{10}$$

In the preceding equation INT2 is the integral from $\theta$spk to $\theta$ of the following expression.

$$[dmb'(\theta)/d\theta - dqw'(\theta)/d\theta][V(\theta)/Vo]^{(Gm-1)} d\theta$$

In integral INT2, the following terms apply.

$$mb'(\theta) = mb(\theta)/mf \tag{11}$$

$$qw'(\theta) = qw(\theta)/(hc\, mf) \tag{12}$$

The term in equation 11 represents the mass fraction of fuel burned at any crank angle, while the term in equation 12 represents the wall heat transfer as a fraction of total fuel energy.

Recognizing that the mass of the combustion chamber contents is the sum of the intake air, intake fuel and residual gases (the gases remaining in the combustion chamber from the previous cycle and recirculated exhaust gases), the following equation applies.

$$m = ma + mr + mf \tag{13}$$

This allows equation 11 to be rewritten.

$$P(\theta) = Pmot(\theta)[1.0 + A1\,A2(\theta)] \tag{14}$$
$$A1 = (hc/cv\, To)[mf/(ma + mr + mf)] \tag{15}$$

$$A2 = INT2 \tag{16}$$

The factor A1 depends primarily on the mass of fuel relative to the mass of diluent, decreasing with greater dilution. The term A2 depends on the time for combustion and the timing of combustion in the cycle along with the wall-heat-loss rate.

Closed Loop Control of Ignition Timing

Losses due to less than complete expansion of the combustion chamber charge increase as combustion is shifted away from being centered at the point of minimum combustion chamber volume (tdc). Heat transfer losses, however, decrease as combustion timing is retarded. Thus the ignition timing for best efficiency (MBT) is that timing that places the combustion event in the cycle to minimize the sum of these two losses. This generally corresponds to placing the middle of the combustion event in the range of 8 to 15 degrees atdc, depending on the distribution of heat release and factors such as engine speed and compression ratio which affect heat transfer.

Figure 3:
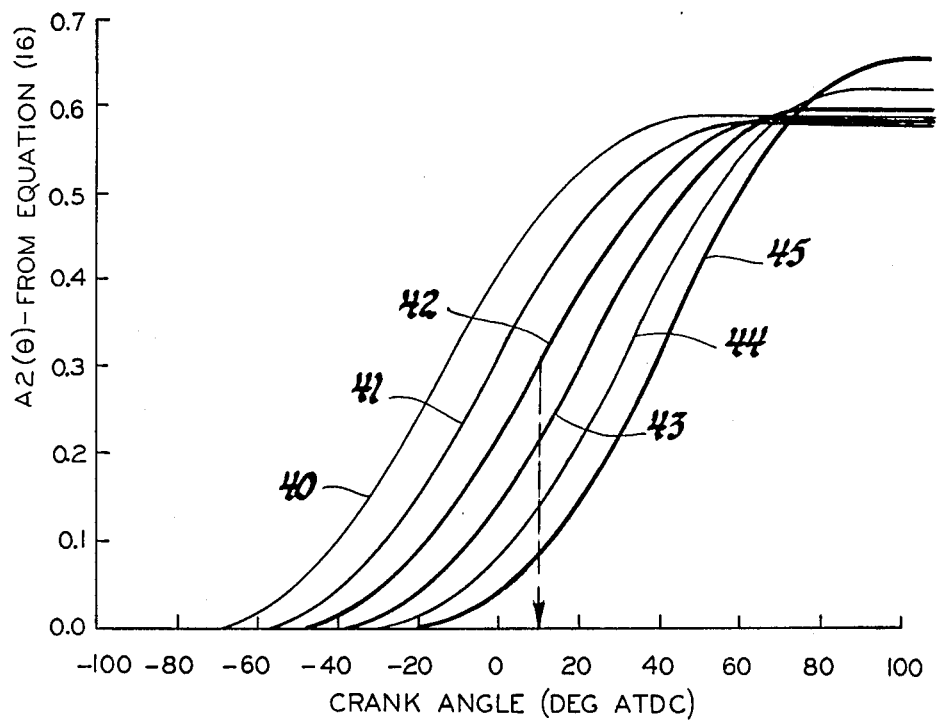
FIG. 3 is a graphical representation of the integral A2 of equation (16) as a function of crankshaft rotational position during combustion in the engine of FIG. 1 for selected combustion initiation timings.

The optimization of ignition timing in feedback control requires that we infer from the combustion pressure trace where the combustion event is placed in the cycle. From equation 14, $A2(\theta)$ is the term dependent on the timing of the combustion event. It is plotted as a function of crankshaft rotational angle in FIG. 3 as calculated for a compression ratio of 8 and with the wall heat loss neglected. The duration of combustion is specified 120 degrees. The mass burn rate is assumed to increase linearly with crankshaft rotational angle up to the 50% mass burned point and then to decrease linearly to the end of combustion, which approximates empirically observed behavior. Curves 40–45 correspond to 50% mass burned fraction timings (CA50%) of −10, 0, 10, 20, 30 and 40 degrees atdc, respectively.

According to the relation defined in equation 14, for the same combustion chamber contents (A1 constant) and the same motored pressure, differences in the value of A2 are related to differences in the fired pressure. The most retarded burn (CA50%=40 degrees atdc) yields a higher value of A2 at 100 degrees atdc than more advanced burns. This occurs because there is less energy removed in expansion work relative to the more advanced cycles, which results in a higher internal energy and thus a higher pressure.

It has been found that the location of the 50% mass burned fraction for best efficiency generally occurs in vicinity of 10 degrees atdc for conventional spark ignition engine compression ratios and for moderate to high engine speeds. Higher compression ratios and lower engine speeds favor somewhat later burning for MBT. For the purposes of this mathematical development, the 10 degree placement of CA50% for MBT will be assumed, although it will turn out that constancy of this figure with varied operating conditions is not a requirement for the invention. From FIG. 3, if the value of the integral $A2(\theta)$ is sampled at 10 degrees atdc and divided by the value at a crank angle when combustion is over, one observes that the cycle with the CA50% at 10 degrees yields a value of this ratio of approximately 0.5. Cycles which were more advanced would yield higher values, while cycles which were retarded would yield lower values. The inclusion of heat transfer does little to modify this result. This behavior forms the basis for controlling the ignition timing by pressure ratio management.

The fractional excursion of A2 between its value before combustion and the value when combustion is complete approximates the fraction of fuel burned at any crank angle. To develop this example further, it is assumed that combustion is completed before 90 degrees atdc. From equation 14 the ratio A2(10)/A2(90), defined as B below, can be computed.

$$B = ([P(10)/Pmot(10)] - 1)/([P(90)/Pmot(90)] - 1) \quad (17)$$

The determination of B requires values of the combustion chamber pressure at four crankshaft rotational angles, including two fired angles which can be sampled directly—namely P(10) and P(90)—and two motored values, which must be approximated. It is a fair assumption to assume that the pressure at 90 degrees atdc, had combustion not occurred (Pmot(90)), is close to the pressure at 90 degrees btdc. This pressure can also be sampled directly. From the pressure measured at 90 degrees btdc, the motored pressure at 10 degrees atdc can be estimated assuming the compression process is polytropic.

$$Pmot(10) = P(-90)[V(-90)/V(10)]^n \quad (18)$$

The polytropic exponent n is nominally 1.3; and the volumes at these two crankshaft rotational angles are known for a particular engine geometry. The value of B is therefore calculable from pressures that can be measured with appropriate transducers.

Generally the sensing of absolute pressure requires a transducer of known gain and bias. This can lead to impractical costs which are possible to circumvent. If a pressure sensing device produces a voltage which is linearly related to the pressure, the following relation applies.

$$E(\theta) = G\ P(\theta) + Ebias \quad (19)$$

The gain G of this transducer is assumed constant for a given cycle but allowed to vary on a longer time scale. A similar assumption is applied to the bias voltage, which is calculable from voltages sampled during the compression stroke according to the following expressions, in which $\theta r$ is some crankshaft rotational angle in the compression stroke prior to combustion.

$$Ebias = [E(-90) - K2\ E(\theta r)]/(1.0 - K2) \quad (20)$$

$$K2 = [V(\theta r)/V(-90)]^n \quad (21)$$

These equations lead to the following expression for B.

$$B = K1[(E(10) - Ebias) - (E(-90) - Ebias)/K1]\ /[E(90) - E(-90)] \quad (22)$$

$$K1 = [V(10)/V(90)]^n \quad (23)$$

Ignition timing can be controlled by sampling the voltage from a pressure sensor at the four specified crankshaft rotational angles and computing B from equations 20–23. The ignition timing is then adjusted from the current value either in proportion to the error signals generated by comparing B to the targeted value of mass fraction burned, Bo, or in constant increments depending on the sign of the error:

if (B−Bo)>0 then retard combustion;
if (B−Bo)<0 then advance combustion.

Because combustion events vary somewhat stochastically on a cycle to cycle basis, averaging the value of B from several consecutive cycles is probably desirable for stability. Since a signal directly related to the combustion pressure is available, knock may be detected using proper filtering of the signal for knock control. The preferred embodiment would be one wherein each combustion chamber is controlled separately. Although the polytropic exponent may be assumed as previously stated, it may also be calculated by sampling one more point along the compression curve.

Certain extreme operating conditions might create problems with the suggested approach to ignition timing control. For conditions of high dilution (idle, high EGR or very lean), it is possible that advancing the ignition could yield cycles that burn later than any for a more retarded timing. Excessive advance under these conditions could produce misfire. Ignition timing under these conditions is best supplemented with dilution control, which may also be accomplished with the pressure ratio management techniques, as described below.

Closed Loop Control of Dilution

In equations 14–16, the total energy liberated in the combustion process is separated from its temporal behavior. The total energy is incorporated in the factor A1 with its dependence on the amount of fuel in the combustion chamber, whereas A2 is affected by the timing and rate of energy release. An increase in the amount of diluent decreases the value of A1. Increased dilution generally reduces flame speed, thereby increasing the time for combustion and altering the integration for computing A2. The influence of combustion duration on the value of the term A2 is examined next.

Figure 2:
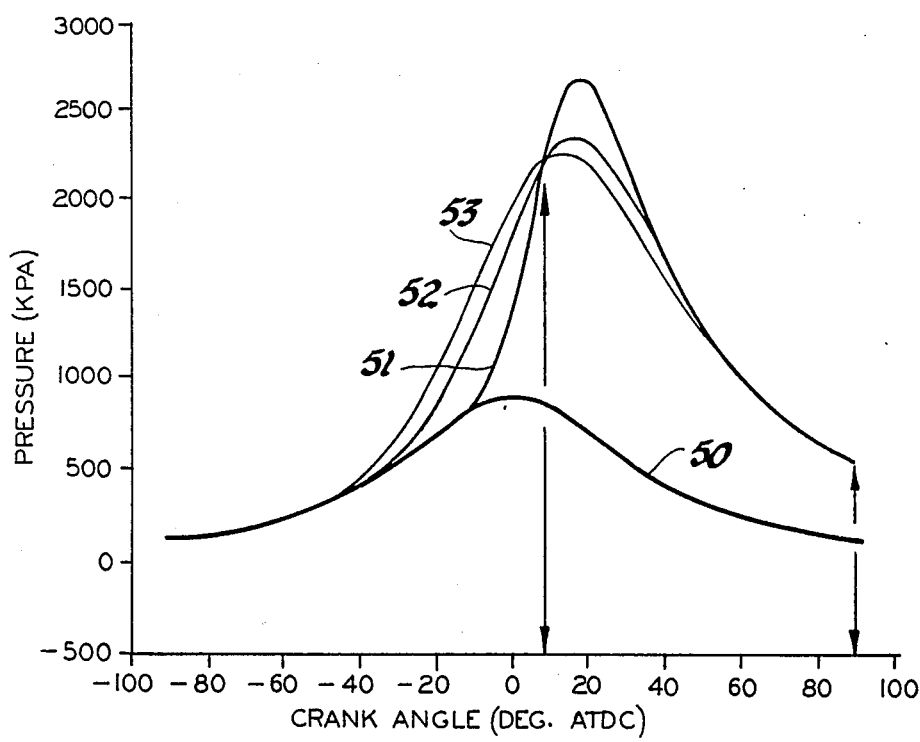
FIG. 2 is a graphical representation of combustion pressure and motored pressure as a function of crankshaft rotational position during combustion in the engine of FIG. 1 for several possible combustion durations.

FIG. 2 shows a plot of motored pressure (curve 50) and the pressure calculated from equation 14, neglecting the heat loss term, for combustion durations of 40, 80 and 120 degrees (curves 51, 52 and 53) and a constant value of A1. The combustion events are timed to place the CA50% at 10 degrees atdc. The pressure traces are observed to be significantly different. They have certain things in common, however. First, at 10 degrees atdc, the pressures are nearly identical. Furthermore, after combustion is completed, the pressures again are nearly identical. This implies that, for MBT timing, the pressure at any point in a cycle depends primarily on the amount of fuel burned to that point and not significantly on the previous history in the cycle. It does depend on the ratio of fuel to diluent, as dictated by term A1. The ratio of fired to motored pressure after combustion has been completed is a measure of the fuel to diluent ratio.

Figure 4:
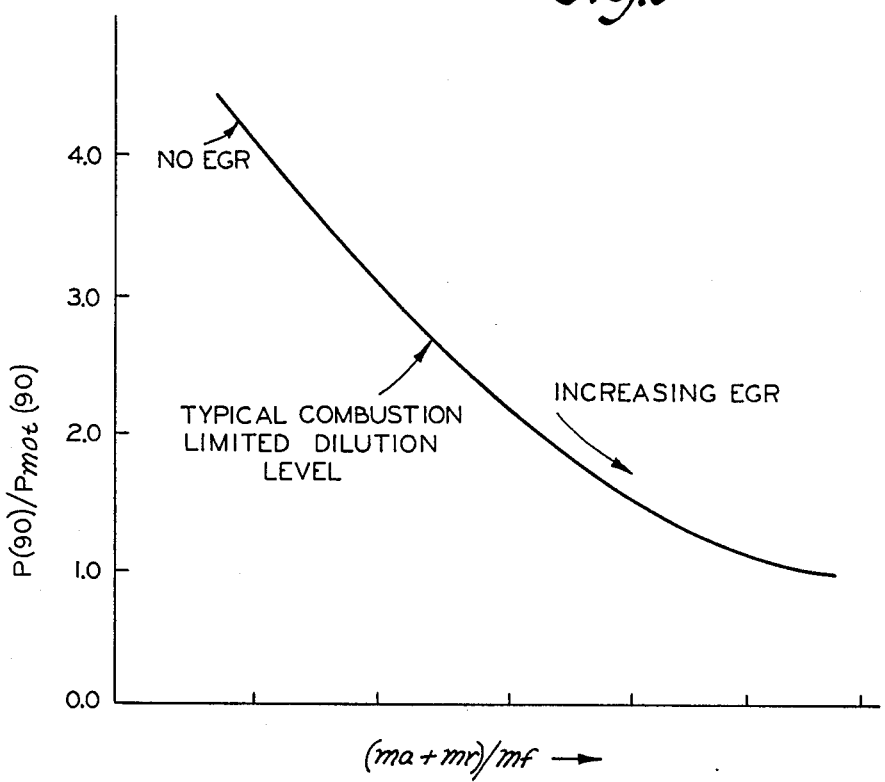
FIG. 4 is a graphical representation of the ratio of combustion chamber pressure to motored pressure after completion of combustion as a function of relative dilution of the fuel charge in the engine of FIG. 1.

The level of dilution depends on the excess air and/or EGR entering the combustion chamber during intake and on the amount of residual gas remaining in the chamber from the previous cycle, which is a function of load, valve timing and exhaust pressure. In general, it is known that increasing dilution increases efficiency and reduces NOx emissions up to the point where combustion rates slow sufficiently to affect efficiency adversely. In FIG. 4, the ratio of fired pressure to the motored pressure evaluated at the crankshaft rotational angle at which combustion is completed is plotted as a function of diluent to fuel ratio. Increasing dilution is observed to decrease the pressure ratio, approaching 1.0 for high dilution. In an actual engine, poor combustion limits the allowable level of dilution and the corresponding pressure ratio to values significantly higher than 1.0. Poor combustion manifests itself in several forms depending on the design of the engine.

The various options for controlling the level of dilution with pressure ratio management can be divided into three primary categories. The first is based on controlling the amount of diluent to a specified value as a function of speed and load. The second option is to use diluent level to adjust the burn rate or combustion time to a specified value. The third is based on using the variability in the pressure ratio among cycles as a dilution level criterion. Each of these options will be discussed.

In the testing of a given baseline engine, it is possible to define a dilution limit based on one of a number of criteria. Whatever the criterion, this dilution level provides a target value for the ratio P(90)/Pmot(90). Since signals for P(90) and Pmot(90) are available from the scheme for ignition timing control, comparison of their ratio to the target value indicates the change required in EGR level. Such control must account for the response time of the EGR valve and the delay associated with the transit time of the flow of exhaust gases from the EGR valve to the combustion chamber. This can be accomplished by averaging a number of cycles to evaluate the dilution level. Depending on the distribution of EGR among combustion chambers, it might be desirable to adjust the dilution to yield the targeted ratio for either a specific combustion chamber, probably the most dilute, or the average of all combustion chambers.

The targeted level of dilution might be a function of both engine speed and load. The dependence of residual gas fraction on load is compensated in this approach. However, turbulence, and therefore flame speed, are lower at light load, which suggests the need for less diluent and a higher pressure ratio target than used at higher loads. Engine speed has an influence on the pressure ratio target because of the longer time available for heat transfer at low engine speed. For the same total dilution, the pressure ratio will be lower at low engine speed because of this effect, which suggests that the target ratio should decrease as speed decreases.

The algorithm for controlling dilution with this option is developed from equation 14, in which the pressure ratio after combustion can be related to the dilution level.

$$A1A2 = [P(90)/Pmot(90)] - 1.0 \quad (24)$$

In this expression A2 has assumed its final value because combustion is complete. The relations specified in equations 21-23 allow evaluation of P(90)/Pmot(90) in terms of sampled voltage.

$$[P(90)/Pmot(90)] - 1.0 = [(K2-1)/K2]([E(90)-E(-90)]/E(-90)-E(\theta r)]) \quad (25)$$

The relative dilution is thus calculable from three sampled voltages. The voltage relation may be defined as follows.

$$C = [E(90) - E(-90)]/[E(-90) - E(\theta r)] \quad (26)$$

The targeted value of A1 A2 may be determined by engine testing. This value will be specified as Co, which might be a function of speed and load. The condition for control of EGR is expressed in the following conditional statements.

$$C > Co[K2/(K2-1)] \text{ increase EGR}$$

$$C < Co[K2/(K2-1)] \text{ decrease EGR}$$

A possible problem condition for the ignition timing control comes when a cycle is both over dilute and retarded. For such a condition it is possible for the combustion timing control to satisfy the control criterion B=0.5 at 10 degrees atdc but not provide true MBT because combustion is retarded sufficiently to be incomplete at the second sampling point at 90 degrees atdc. Even if this is the case, the dilution algorithm will properly direct a decrease in the level of dilution. The ignition timing will eventually stabilize to a true MBT as the level of dilution is decreased. This situation would most commonly be encountered after a rapid reduction in throttle, for which a quick return to MBT is probably not important.

Figure 6:
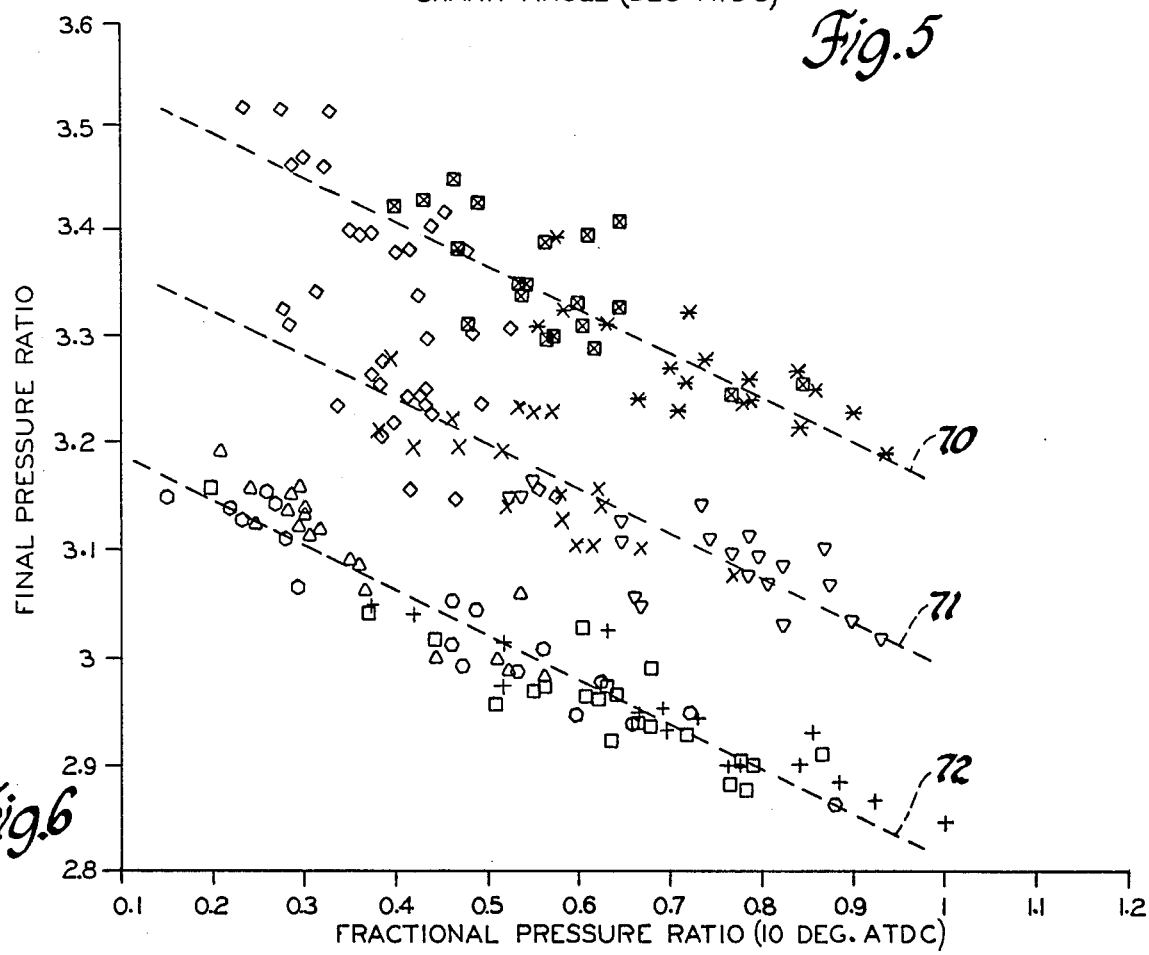
FIG. 6 is a graphical representation of a large number of combustion events on a plot of final pressure ratio vs. fractional pressure ratio at 10 degrees atdc.

Although the algorithm as described above uses the average final pressure ratio over a plurality of engine cycles, it may also be used for a single cycle for better transient performance with a slight modification. FIG. 6 shows the final pressure ratio and fractional pressure ratio at 10 degrees atdc for a large number of combustion events at three different air/fuel ratios: 18/1 (curve 70), 21/1 (curve 71 and 24/1 (curve 72). Air/fuel ratio was varied by changing the airflow with fuel flow held constant. For each air/fuel ratio the separate symbol types correspond to cycles from three different ignition timings. The fractional increase in the pressure ratio at 10 degrees atdc is the timing parameter previously designated as B. For the engine speed corresponding to the data shown, the best efficiency spark timing produced a cycle average value of 0.6 for B. Cycles with higher values are overadvanced, while cycles with lower values are retarded. As FIG. 6 shows, overadvanced cycles produce lower final pressure ratios than more retarded cycles with the same mixture strength. Two factors are responsible for this behavior. The more advanced a cycle is, the greater are the heat losses to the chamber walls because of higher temperatures and pressures during the flame process. This results in a lower pressure when combustion is complete. As the combustion process is moved away from being centered at tdc there is a reduction in the amount of work removed from the combustion gases, which increases the pressure after combustion. This, combined with the reduced heat loss, increases the final pressure ratio as the timing of a cycle is more retarded.

The influence of timing on the final pressure ratio must be considered when estimating relative dilution. This is accomplished by estimating the value of the pressure ratio had the cycle occurred with an optimum value of the timing parameter. Since the slopes of the lines in FIG. 6 are essentially equal, the sensitivity of the final pressure ratio to the timing parameter is independent of the dilution level. The final pressure ratio for optimum timing can be expressed in terms of the slope of the line, d(PRF)/dB, the final pressure ratio for the cycle, PRFi, and the difference between the timing parameter of the cycle, Bi, and the value for optimum timing, Bo.

$$PRF(Bo) = PRFi + (d(PRF)/dB)(Bi - Bo) \quad (27)$$

Subtracting the value of 1.0 from PRF(Bo) produces the parameter proportional to the relative dilution, mf/(ma mr +mf). With the single cycle approach, it is apparent that the combustion events at each air/fuel ratio cluster about an essentially straight line and that the lines appear to be parallel. The individual combustion events may vary greatly in fractional pressure ratio at 10 degrees atdc, although the average is being maintained at a target of 0.6, for example. For a given air/fuel ratio, therefore, the observed final pressure ratio of each individual combustion event may be converted to the equivalent final pressure ratio at 0.6 ten degree atdc pressure ratio as long as the fractional pressure ratio at 10 degrees atdc is known for the individual combustion event, which it is. As an example of this conversion, assume a calculated final pressure ratio of 3.1 and a ten degree atdc pressure ratio of 0.3 for a single combustion event. Referring to FIG. 6, this corresponds to a point on curve 72. Moving down curve 72 until a ten degree atdc pressure ratio of 0.6 is reached, one may read out a corrected final pressure ratio of 3.0. If the point had not been on one of curves 70–72, another curve could have been drawn parallel to them through the point. With the single cycle approach, the control may be used in a much faster mode with individual combustion events rather than being based solely on the average of many combustion events, with improved transient performance.

As described to this point, this option for dilution control is straightforward. However, the pressure ratio is being used to control the amount of diluent to a specified level, or percentage of the intake level, based on the performance of a baseline engine. This limit is not necessarily the same for the engines eventually manufactured or for aged engines. It would be preferred that the dilution level be related to a more fundamental characteristic of combustion at the dilute limit, which the pressure signal can sense. One possibility is to update the stored target final pressure ratio during engine operation; and an improvement using this approach will be described along with the third option of dilution control. Before this, however, a second option of dilution control will be described.

In the previous option of pressure dilution level control by pressure ratio management, the magnitude of the final pressure ratio was used to control the dilution level. The time for combustion also depends on dilution level. Alternative dilution control algorithms can be formulated based on this dependence. Since the combustion timing is to be controlled by placing the 50% mass fraction burned at a given crankshaft rotational angle, it is possible to adjust the mass fraction burned at a different crankshaft rotational angle by varying the level of dilution. This is equivalent to specifying the time to burn a given mass fraction or a combustion duration. The mass burn fraction profile is thus tailored by using the level of dilution.

Presume that, for optimum dilution, combustion is 90% complete at a given crankshaft rotational angle: 60 degrees atdc, for example. By sampling the voltage at this crankshaft rotational angle and computing a parameter equivalent to parameter B in the combustion timing application, dilution should be increased if the value is greater than 0.9 or decreased if it is less than 0.9. This application requires the sampling of two more voltages, E(60) and E(-60), the latter being assumed to be equivalent to Emot(60). If E(-60) is also selected as E(8r) in the combustion timing application, this implementation requires the sampling of only one extra voltage, E(60). In this form the mass fraction burned at 60 degrees atdc can be specified by D, as follows.

$$D = [Pmot(90)/Pmot(60)][P(60) - Pmot(60)]/[P(90) - Pmot(90)] \quad (28)$$

This may be expressed in terms of the sampled voltages.
$$D = [V(60)/V(90)]''[E(60) - E(-60)]/[E(90) - E(-90)] \quad (29)$$

This approach has an attractive feature if the value of D is chosen as 1.0. In those cases where extreme dilution and retard might produce a burn which satisfies the combustion timing criterion, the value of D will be less than 1.0 whenever burning is not complete at 60 degrees atdc. This will yield a request for less dilution and stabilize the ignition timing.

In specifying pressure ratio management control based on sampling at a crankshaft rotational angle after 10 degrees atdc, characteristics of combustion late in the burn are emphasized. Similar control options exist to emphasize the time for the first portion of the burn by specifying the mass fraction burned at a crank angle before 10 degrees atdc. Alternatively, the time from combustion initiation to the 50% mass burned fraction point could be specified by adjusting dilution level until MBT timing occurs at a targeted advance.

The previous two options of dilution control are based on the average behavior of collections of cycles. As previously mentioned, it has been observed that, as the dilution limit is approached, a greater number of abnormally late burning cycles are produced. This behavior suggest a third possible criterion for the control of dilution.

Figure 5:
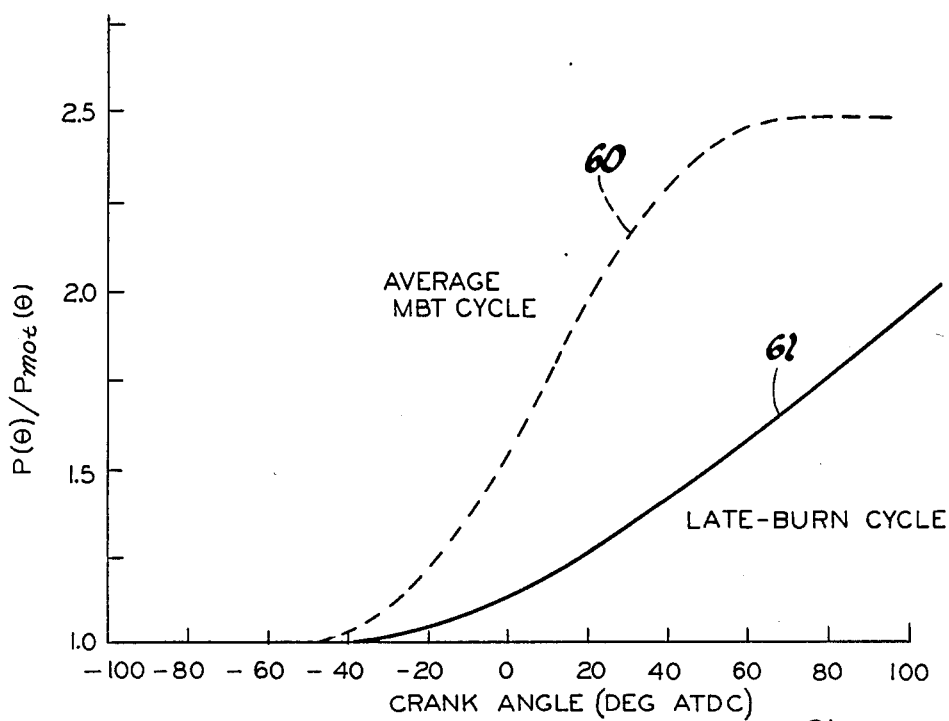
FIG. 5 is a graphical representation of the ratio of combustion chamber pressure to motored pressure as a function of crankshaft rotational position during combustion in the engine of FIG. 1 for an average MBT cycle and a late burn cycle.

FIG. 5 shows typical traces of the pressure ratio as a function of crankshaft rotational angle. Curve 60 corresponds to a nominal cycle with the burn placed optimally so that the 50% mass fraction burned point, and therefore 50% of the final pressure ratio, occurs at 10 degrees atdc. Curve 61 corresponds to a late burn cycle. A late burning cycle will produce a low value of mass fraction burned at the 10 degree atdc sampling point, whereas the average of the collection of cycles will yield a value of 0.5 because the combustion timing is adjusted to yield this value. A current cycle average of B at the 10 degree atdc point could be used as a late burn indicator. If late burns are detected over a sampling period of some number of cycles, dilution should be decreased. If no late burns are sensed, the dilution should be increased. This technique places a bound on the extremes of the variation of mass burned at a given point in the cycle. Similarly, the variability in B could be computed and adjusted to a targeted value using dilution level.

The late burn technique also shows the possibility of being used to update the target final pressure ratio of the first option in dilution control. This final pressure ratio was described earlier as being determined for a baseline engine and stored as a reference in ROM, perhaps in a table as a function of one or more other engine parameters such as speed or load. However, the normal differences among engines and changes due to engine age and wear may be compensated if some parameter exists which allows correction of the stored reference during engine operation. The late burn technique determines the lean limit for the engine, since it identifies the operating condition on the verge of misfire, where efficiency begins to suffer. The first option may be run on a continuous basis, with dilution level controlled to maintain a predetermined final pressure ratio. However, the number of late burns may be counted over a comparatively long series of cycles with the result used to adjust the target final pressure ratio. Thus the stored reference could be regularly updated in engine operation to produce engine operation at the lean limit.

It is usually desirable to use the various dilution control options discussed above in combination with the combustion pressure control of ignition timing as previously described, since many of the equations are common and efficiency in calculation and computer time is promoted. However, it is also possible to use any of the dilution control methods by itself, with a slightly different method of ignition timing control. When a dilution level is computed according to any of the methods described, ignition timing is derived from a stored table in ROM or RAM addressed by engine speed and dilution level. Since the dilution level input depends on combustion pressure, this factor also affects ignition timing through the table lookup. However, this method may have some advantage in that it is thought that it may be used without the averaging (lag filter function) normally required for ignition timing control as described earlier and thus enable the ignition timing to respond more quickly to transients while still allowing dilution flow control by combustion chamber pressure.

Control of Fuel Flow and the Lean Burn Engine

EGR to control NOx emissions has been widely implemented because difficulties were encountered when the alternative of lean operation was attempted. Generally, for the same masses of EGR and excess air, flame temperatures are somewhat higher and oxygen more plentiful with excess air, which favors higher NOx production. With sufficient dilution with excess air (air/fuel ratios above 18/1), flame temperatures are sufficiently low to inhibit NOx. At this level of dilution, combustion rates are slowed. Because most engines do not distribute fuel equally to all combustion chambers, some will operate leaner than the overall mixture ratio, some richer. Richer mixture combustion chambers will be operating over advanced and producing higher NOx than would be indicated by the overall air/fuel ratio, while leaner mixture combustion chambers will be retarded and yield less power than if they were timed optimally. The overall dilution level of the engine is additionally limited by poor combustion in the chamber with the leanest mixture.

For these reasons it is desirable for the optimal implementation of a lean calibrated engine to adjust combustion timing and air/fuel ratio on an individual combustion chamber basis. The potential benefits arise from NOx control without the reducing catalyst and difficult to control EGR system. It will be assumed that fuel is supplied to each combustion chamber of the engine through a separate fuel injector. The amount of fuel injected is presumed to be adjusted by specifying the duration of an electrical pulse to the injector driver. Because of manufacturing tolerances and differences in temperature, the amount of fuel delivered to each chamber can vary. It is assumed that the intake manifold and intake ports are designed to produce minimal differences in airflow among the chambers. This being the case, differences among the chambers in air/fuel ratio can be attributed to differences in fuel flow rate.

Once it has been specified that dilution is controlled by adjusting excess air, it is reasonable to make fuel rate the variable that responds to the driver's load request rather than air as regulated by the traditional intake throttle. In the proposed scheme, load demand is specified by the accelerator pedal, which directly adjusts the mean pulse duration of the injectors. The air throttle is adjusted to correspond to the mean injector pulse but trimmed to adjust the diluent flow rate.

As shown in equations 14 and 15, the pressure ratio after combustion is directly related to the ratio of fuel mass to total mass in the combustion chamber. Differences in individual chamber values of the pressure ratio can be attributed to fueling differences. In terms of sampled voltages, the term proportional to the fuel rate is represented by equation 26, which is repeated here with the letter "i" to indicate that the value is computed for each combustion chamber.

$$Ci = [Ei(90) - Ei(-90)]/[Ei(-90) - Ei(\theta r)] \quad (30)$$

It is assumed that the total fuel rate to the engine will remain approximately constant if the average pulse duration remains constant. The pulse duration for each injector can then be adjusted by multiplying the mean pulse duration by the ratio of the average value of C among all combustion chambers to the individual chamber value.

$$Ti = Tmean\ (Cmean/Ci) \quad (31)$$

The airflow to the engine is controlled to maintain the dilution limit as sensed by one of the three techniques suggested previously. Naturally, this method of fuel flow control fits nicely with the ignition timing control based on combustion chamber pressure as described earlier, since the pressure sensor and some of the equations are in common; however, this fuel control method has utility of its own and may be used with other ignition timing systems and with engines using dilution gas rather than lean air/fuel ratios for dilution.

In operation the engine behaves as follows. At idle the residual fraction is high, resulting in an air/fuel ratio approximating stoichiometric. As the load demand is increased, approximately constant dilution is maintained and air/fuel ratio thus increases. Eventually a point is reached in the vicinity of 60% load where the air throttle is wide open and the engine operates at its leanest allowable air/fuel ratio (nominally 22/1). At this point the airflow is maximum and a request for more power results in a higher fuel flow and a richer mixture. At approximately 75% load the air/fuel ratio has been decreased to about 18/1. Further enrichment may be achieved without greatly increasing NOx production by "switching" the air/fuel ratio to the other side of stoichiometry one chamber at a time and thus avoiding the region of high NOx production.

A lean burn engine control based on pressure ratio management should operate with higher driveability than an engine calibrated with high levels of dilution. In the latter engine, increased load demand is initiated by a change in the air throttle. The airflow thus leads the fuel flow, which temporarily produces even leaner cycles and a possible "sag" in engine response. If the control structure is reversed, as in the lean implementation suggested here, fuel flow will lead the airflow and produce richer cycles in the initial stages of acceleration to provide more rapid combustion. This approach might result in a greater tendency to knock; but actual knock may be contained with a knock control based on the same pressure signals.

Hardware and Software Description

Apparatus capable of controlling an internal combustion engine according to the principles discussed above is shown schematically in FIG. 1. Engine 10 is a spark ignited internal combustion engine having four combustion chambers or cylinders 11, an intake manifold 12 with a throttle 13, an exhaust manifold 15 with an oxidizing catalyst 16 and a rotating crankshaft, not shown, through which power is transferred from cylinders 11 to the vehicle drivetrain. Each cylinder 11 is provided with an intake valve 17 communicating with intake manifold 12, an exhaust valve 18 communicating with exhaust manifold 15, a spark plug 20, a fuel injector 21 in intake manifold 12 adjacent intake valve 17 and a combustion chamber pressure sensor 22.

Computer 23 is a digital computer including the standard elements of CPU, RAM, ROM, input/output circuitry and clock circuitry. Appropriate inputs and outputs are indicated for sending signals from computer 23 to fuel injectors 21 (F1-F4) and spark plugs 20 (S1-S4) and to computer 23 from pressure sensors 22 (P1-P4). The computer may be a variant of those used for computerized engine control on prior art vehicles based on the Motorola 68000 (R) series microprocessor. Spark plugs 20 and fuel injectors 21 are of the type normally used in the prior art.

Combustion chamber pressure sensors 22 may be any known type of pressure sensor adapted or adaptable to sensing the pressure inside combustion chambers 11, providing they generate a linear voltage output signal with a gain and bias that do not change significantly during a cycle of engine 10. One sensor which might be appropriate is a piezoelectric deflection type of transducer which includes a finger projecting through the cylinder water jacket to sense pressure caused deflections of the combustion chamber wall. Another sensor which might be appropriate is a piezoelectric sensor attached directly to the combustion chamber wall. Sensors with membranes of piezoelectric or other materials exposed directly to the combustion chamber interior or combined with the spark plug are further possibilities. There is another promising sensor in which a fiber optic conductor is routed through a tortuous course in the spark plug body to be deflected by combustion chamber pressure variations in such a way as to affect the light transmissibility thereof. Further research is required to determine the best pressure transducer.

An ignition circuit 25 is effective when signaled by computer 23 to generate a high voltage pulse to activate a spark plug 20 and to direct the pulse to the proper plug. It may include the standard distributor and take any appropriate form from the prior art. The invention is not concerned with how the pulses are generated or directed to the plugs 20 but with when the signal pulses are generated within computer 23 for ignition timing. Signals indicative of crankshaft rotational position are generated in crank angle signal generating apparatus 26 which may include a toothed wheel 27 and a Hall effect, magnetic or optic pickup 28. Any reasonably accurate rotational angle sensing system from the prior art may be used; however, the more accurate the system and its mounting on engine 10, the more the benefit gained from this invention. An EGR valve 30 controls the flow of diluent gases from oxidizing catalyst 16 back to intake manifold 12 and includes a positioning motor controlled by signals from computer 23 over the line marked EGR.

The implementation of the algorithms already discussed should be clear to any programmer skilled in the art of engine control. The signal pulses from crankshaft rotational position sensor 26 may be used to generate interrupts in the main operating program of computer 23. If these interrupts occur with a frequency as high as the required accuracy of crankshaft angle determination, the interrupts may simply trigger a counter or increment a memory location used to keep track of the angle. If, as appears more likely, some interpolation between interrupts is required, higher frequency pulses from a real time clock may be used to measure the time between interrupts with the time being computationally subdivided to generate the counter triggering pulses. Numbers representing the required crankshaft rotational angles for pressure sensing are stored in memory and continually compared to the counter for the generation of pressure sensing signals at the proper time. Each such pressure sensing signal causes the digitized pressure voltage signal to be captured and stored in the appropriate memory location or register.

The pressure sensing takes place for each engine cycle during the crankshaft rotational angle between 90 degrees btdc and 90 degrees atdc. Following the last required sensed pressure value, the computer is signaled to commence computation of the required parameters, comparison with appropriate stored or computed references and output of control signals to output circuitry effective to generate ignition signals, injection signals and control signals for the EGR valve. The particulars of the program will depend on choice of apparatus and of algorithms.

An example of the control algorithm will be given. Assume that the combustion chamber pressure is sampled at 90 and 60 degrees btdc ($-90$, $-60$) and at 10 and 90 degrees atdc. For ignition timing, equation (20) is first evaluated, with $E(\theta r)$ being the reading at $-60$ degrees. Next, the resulting value of Ebias is used in the solution of equation (22) for the parameter B. In these equations, K1 and K2 are predetermined from the known combustion chamber geometry from equations (23) and (21), respectively, and stored in ROM for use in the calculations. The parameter B is averaged over a plurality of engine cycles with a first order lag function and, with each new update the average is compared with a predetermined constant from a table or single location in memory to determine whether ignition timing is advanced or retarded.

Continuing with the first dilution control option, parameter C is calculated from equation (26) and either averaged over a plurality of engine cycles or converted as described earlier to an equivalent value for MBT timing and compared with a predetermined target value. This target value may be a reference stored in ROM or an updated reference based on the late burn criterion of the third option as described earlier and below. EGR is increased or decreased depending on the sign of the comparison. If the second dilution control option is chosen, the parameter D, rather than C, is calculated from equation (29). This, of course, requires one more sampled sensor voltage, at 60 degrees atdc. The value of D is compared to a predetermined target value stored in ROM. If the third dilution control option is chosen by itself, neither C nor D need be calculated. An average value of B is maintained as a reference to which the individual values of B are compared. The individual values of B which fall short of the average value by an amount greater than a predetermined, stored reference value are summed during a sample period of predetermined duration and compared with another predetermined, stored reference value. The result of this comparison determines whether EGR is increased or decreased, with decrease resulting from too many low values of B signaling too many late burns, as previously described. If the third option is used to update the target value of C for the first option, the result of the comparison may be used to adjust the targeted value of C in one direction or the other.

If the engine uses one of the dilution control options but does not use the ignition timing option, dilution is determined first by any of the algorithms described above and the ignition timing is then derived from a lookup table in ROM or RAM addressed by dilution level and engine speed, the latter being determined in a manner well known in the art from the pulses generated by crank angle signal apparatus 26. It is expected that individual values of dilution level will be used without averaging for good transient response.

If the engine is a lean burn engine with individually controlled fuel injectors and balanced intake airflow for each combustion chamber, fuel charge balancing may also be included. The parameter $C_i$ is calculated from equation (30) for each combustion chamber. From these values the average or mean value of C, Cmean, may be calculated and the fraction Cmean/$C_i$ determined for each combustion chamber. The injector pulse width $T_i$ for each injector, determined by whatever fuel control algorithm is selected for a desired average fuel flow rate, is multiplied by the fraction Cmean/$C_i$ for the injector to produce a balanced fuel charge.

Naturally, all the normal techniques of feedback control may be used as desired. For example, the value of a parameter such as B, C or D, which is to be compared to a stored reference, may be averaged with a lag filter function; a dead band may be established; and the correction value may be of constant absolute value or some variant of proportional control, all at the choice of the designer to fit the particular engine.

When calculations are complete, the output correction values for ignition timing and EGR, if the engine is not a lean burn engine, are provided to the normal control routines or circuits for controlling these parameters. The correction factor for fuel injection timing is provided to the injection timing routine. The actual control of the ignition, EGR valve and fuel injectors from this point is well known in the prior art. t,0350

The embodiments of the invention in which an exclusive property or privilege is claimed are defined as follows:

1. A combustion control for an internal combustion engine of the type having a combuation chamber, a rotating crankshaft, ignition apparatus for the combustion chamber and diluent gas flow control apparatus comprising, in combination:
   means responsive to combustion chamber pressure to generate signals for a combustion event indicating combustion pressure and motored pressure at a predetermined crankshaft rotational angle when combustion is substantially complete;
   means effective to compute, from the signals, a final pressure ratio of combustion pressure to motored pressure at the predetermined crankshaft rotational angle when combustion is substantially complete;
   means effective to adjust the diluent flow to maintain the final pressure ratio at a predetermined level, whereby diluent flow is optimally controlled.

2. The combustion control of claim 1 in which the combustion pressure at the predetermined crankshaft rotational angle when combustion is substantially complete is sensed directly and the motored pressure at the predetermined crankshaft rotational angle when combustion is substantially complete is derived from the sensed combustion chamber pressure at a predetermined crankshaft rotational angle prior to ignition having substantially the same combustion chamber volume.

3. The combustion control of claim 2 in which the predetermined crankshaft rotational angle when combustion is substantially complete is 90 degrees atdc and the predetermined crankshaft angle prior to ignition is 90 degrees btdc.

4. The combustion control of claim 1 in which the predetermined level is a stored reference value.

5. The combustion control of claim 4 in which the stored reference value is derived as a function of engine speed and load.

6. The combustion control of claim 1 in which the means effective to adjust the diluent flow derives a time averaged final pressure ratio from a plurality of successive final pressure ratio values for the combustion chamber and maintains the average final pressure ratio at the predetermined level.

7. The combustion control of claim 1 in which the ignition apparatus is effective to maintain ignition timing at MBT.

8. The combustion control of claim 1 in which:
   the ignition apparatus is effective to derive another pressure ratio of combustion pressure to motored pressure at another predetermined crankshaft rotational angle during combustion and maintain the other pressure ratio minus one, on an average basis over a plurality of successive combustion events for the combustion chamber, as a predetermined fraction of the final pressure ratio minus one; and
   the means effective to compute a final pressure ratio is further effective to store a mathematical relationship between the final pressure ratio and the fractional pressure ratio at the other crankshaft rotational angle during combustion and modify the computed final pressure ratio for an individual combustion event using the stored relationship in response to the other pressure ratio derived by the ignition apparatus.

9. The combustion control of claim 1 in which:
the ignition apparatus is effective to derive another pressure ratio of combustion pressure to motored pressure at a first predetermined crankshaft rotational angle during combustion and maintain the other pressure ratio minus one, on an average basis over a plurality of successive combustion events for the combustion chamber, as a first predetermined fraction of the final pressure ratio minus one;
further means are responsive to combustion chamber pressure to derive the pressure ratio of combustion pressure to motored pressure at a second predetermined crankshaft rotational angle during combustion; and
the means effective to adjust the diluent flow maintains the final pressure ratio minus one as a predetermined fraction of the pressure ratio minus one at the second predetermined crankshaft angle during combustion.

10. The combustion control of claim 1 in which:
the ignition apparatus is effective to derive another pressure ratio of combustion pressure to motored pressure at another predetermined crankshaft rotational angle during combustion and maintain the other pressure ratio minus one, on an average basis over a plurality of successive combustion events for the combustion chamber, as a predetermined fraction of the final pressure ratio minus one;
further means are effective to count individual combustion events for the combustion chamber in which the other pressure ratio derived by the ignition apparatus is different by a predetermined amount from the predetermined fraction of the final pressure ratio; and
the means effective to adjust the diluent flow is further effective to adjust the predetermined level of the final pressure ratio in response to the count determined by the last means.

11. The combustion control of claim 1 in which the ignition apparatus derives ignition timing from a stored function of engine speed and dilution level.

12. A combustion control for an internal combustion engine of the type having a combustion chamber, a rotating crankshaft, ignition apparatus for the combustion chamber and diluent gas flow control apparatus comprising, in combination:
a pressure sensor responsive to combustion chamber pressure to generate an output voltage, the pressure sensor being linear with a gain and bias which do not significantly vary during a single engine cycle;
means effective to sample the output voltage of the pressure sensor at a first predetermined crankshaft rotational angle in the compression stroke prior to ignition, a second predetermined crankshaft rotational angle during combustion and a third predetermined crankshaft rotational angle at substantially complete combustion, the first and third predetermined crankshaft angles having essentially identical combustion chamber volumes;
means effective to derive, from the sensor voltage outputs at the first, second and third predetermined crankshaft rotational angles, a pressure ratio of combustion pressure indicated by the pressure sensor to motored pressure at the third predetermined crankshaft rotational angle;
means effective to adjust the diluent flow to maintain the pressure ratio at a predetermined level, whereby diluent flow is optimally controlled.

13. The combustion control of claim 12 in which a quantity C is derived according to the following equation:

$$C=(E3-E1)/(E1-E2)$$

wherein E1, E2 and E3 are sensor output voltages at the first, second and third predetermined crankshaft rotational angles, respectively, and diluent flow is increased when $$C>Co[K2/(K2-1)]$$

and decreased $$C<Co[K2/(K2-1)],$$

wherein $$K2=(V2/V1)^n,$$

Co is a predetermined targeted value of C, n is the polytropic index and V1 and V2 are combustion chamber volumes at the first and second predetermined crankshaft rotational angles, respectively.

14. The combustion control of claim 13 in which a quantity D is derived according to the following equation:

$$D=(V3/V4)^n(E3-E2)/(E4-E1)$$

wherein E1, E2, E3 and E4 are sensor output voltages at the first, second, third and fourth predetermined crankshaft rotational angles, respectively, n is the polytropic index and V3 and V4 are combustion chamber volumes at the third and fourth predetermined crankshaft rotational angles, respectively, and diluent flow is increased or decreased when D is greater or less, respectively, than a targeted value.

15. A combustion control for an internal combustion engine of the type having a combustion chamber, a rotating crankshaft, ignition apparatus for the combustion chamber and diluent gas flow control apparatus comprising, in combination:
a pressure sensor responsive to combustion chamber pressure to generate an output voltage, the pressure sensor being linear with a gain and bias which do not significantly vary during a single engine cycle;
means effective to sample the output voltage of the pressure sensor at first and second predetermined crankshaft rotational angles in the compression stroke prior to ignition and at third and fourth predetermined crankshaft rotational angles after ignition, the first and fourth predetermined crankshaft angles having essentially identical combustion chamber volumes and the second and third predetermined crankshaft angles having essentially identical combustion chamber volumes;
means effective to derive, from the sensor voltage outputs at the first, second, third and fourth predetermined crankshaft rotational angles, pressure ratios of combustion pressure indicated by the pressure sensor to motored pressure at the third and fourth predetermined crankshaft rotational angles;
means effective to adjust the diluent flow to maintain the pressure ratios in a predetermined proportion, whereby diluent flow is optimally controlled.

* * * * *